United States Patent
Ushimaru

[11] Patent Number: 6,069,327
[45] Date of Patent: *May 30, 2000

[54] SWITCH DEVICE

[75] Inventor: Hiroshi Ushimaru, Miyagi-ken, Japan

[73] Assignee: Alps Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,995

[22] Filed: Nov. 1, 1996

[30] Foreign Application Priority Data

Jun. 11, 1995 [JP] Japan .................................. 7-287401

[51] Int. Cl.$^7$ .................................................. H01H 9/00
[52] U.S. Cl. ........................................ 200/5 R; 200/6 A
[58] Field of Search .............................. 200/7, 5 R, 5 A, 200/6 R, 6 A, 172, 16 R, 16 C, 160, 18, 512, 517, 339, 341

[56] References Cited

U.S. PATENT DOCUMENTS

| | | | |
|---|---|---|---|
| 4,428,649 | 1/1984 | Main et al. | 350/289 |
| 4,501,939 | 2/1985 | Hyltin et al. | 200/6 A |
| 4,532,575 | 7/1985 | Suwa | 361/413 |
| 4,861,950 | 8/1989 | Yanai et al. | 200/5 R |
| 4,866,221 | 9/1989 | Obermann et al. | 200/5 R |
| 4,918,264 | 4/1990 | Yamamoto et al. | 200/5 R |
| 4,975,547 | 12/1990 | Nakayama et al. | 200/5 |
| 5,147,900 | 9/1992 | Dionisio, Jr. et al. | 200/16 R |
| 5,350,891 | 9/1994 | Ditzig | 200/6 A |

*Primary Examiner*—Michael A. Friedhofer
*Attorney, Agent, or Firm*—Brinks Hofer Gilson & Lione

[57] ABSTRACT

A switch device including a case with an open bottom and a holder therein, a first movable contact member secured to the holder and provided with a movable contact section, a bottom plate for covering the open bottom of the case, a slide knob for performing switching operations, a slider joined to the slide knob through a slot formed in the case so as to reciprocate and having a thick-walled section which causes the movable contact section moving vertically as the slider reciprocates, and a printed board inserted into the case and provided with a first fixed contact which comes into contact with the movable contact which moves vertically, whereby electricity is conducted. The switch device makes it possible to minimize sliding at the contact section, so that the contact section does not wear after long use.

14 Claims, 6 Drawing Sheets

PRIOR ART

SWITCH DEVICE

BACKGROUND OF THE INVENTION

1. Field of the Invention

The present invention relates to a switch device in which an operating member movably retained at the upper portion of a case is operated in order to selectively operate a plurality of switch elements in the case.

2. Description of the Related Art

An example of such a switch device in which an operating member is operated to selectively operate a plurality of switch elements is the mirror switch device which is used, for example, to remotely operate the left and right mirrors provided on the body of an automobile, and the mirror angle from an operator's seat by making use of the driving power of a motor.

A description of such a conventional mirror switch device will be given, with reference to FIGS. 5 to 7. FIG. 5 is a vertical section of the conventional mirror switch device, FIG. 6 is an exploded perspective view thereof, and FIG. 7 is a bottom view of the case of the conventional mirror switch device.

Referring the figures, reference numeral 20 denotes a case with an open bottom, which has a partition wall 21 provided therein. Above the partition wall 21 are provided side by side a relatively deep hollow section 22 which is substantially square-shaped in a plane and is relatively deep, and a shallow recess 23 which is substantially rectangular in a plane. Cylindrical, annular walls 24 are formed upright at four corners of the hollow section 22 so as to project below the partition wall 21. Through holes 25 are formed so as to extend in the vertical dimension. A projecting wall 27 defining a through hole 26 which is cross-shaped in a plane is formed at about the central portion of the hollow section 22. The upper end thereof is slightly higher than the annular walls 24. A drainage hole 28 is formed at one side of the case 20, with which the hollow section 22 communicates with the open bottom of the case 20. A slot 29 is formed in the recess 23, and a pair of guide plates 30 extends vertically and parallel to each other at the back side of the recess 23 via the slot 29. An operation member 31, being substantially square-shaped in a plane, is retained in the hollow section 22 such that it can be moved vertically. More specifically, the member 31 is retained by retaining pawls 32 that are retained by the peripheral sides of the through hole 26 formed in the hollow section 24. The retaining pawls 32 are disposed so as to extend vertically from four locations at the lower central portion of the operation member 31. It is to be noted that the operation member 31 is inserted in the hollow section 22, with a click rubber 33 provided between it and each annular wall 24.

Reference numeral 34 denotes a cover for covering the lower open end of the case 20, and is snapped in the case 20 in order to form the outer shell of the switch device. A guide wall 35 is formed in the cover 34 so as to extend vertically. It defines three first accommodating sections 36 rectangular in a plane, and one second accommodating section 37 rectangular in a plane. Drainage holes 38 are formed so as to extend vertically through a peripheral section of the cover 34, and communicate with the drainage hole 28, when the cover 34 is mounted to the case 20. A plurality of small holes 29 are formed in the cover 34. First slides 40 are disposed such than they can reciprocate in their respective first accommodating sections 36, while a second slider 41 is disposed such that it can reciprocate in a second accommodating section 37. A tapered face 40a forms an end of each first slider 40, while a spring receiving section 40b forms another end thereof, with a spring 42 interposed between each spring receiving section 40b and a guide wall 35. A recess 40c is formed in the upper portion of each first slider 40, with a first sliding member 43 serving as a movable contact inserted and retained in each recess 40c. On the other hand, a drive projection 41a is formed on the upper surface of the second slider 41, with a pair of recess sections 41b formed on each side of the drive projection 41a. Second sliding members 44 serving as movable contacts are inserted and retained in the recess sections 44b.

Reference numeral 45 denotes a printed board which is interposed and fixed between the case 20 and the cover 34, and keeps the first sliders 40 and the second slider 41 in the first accommodating sections 36 and the second accommodating section 37, respectively. In addition, the printed board 45 has formed therein a pair of cutouts 45a, circular holes 45b, and a rectangular hole 45c, with the tapered face 40a of each first slider 40 facing the cutouts 45a, 45a, and the hole 45b, respectively, and the drive projection 41a of the second slider 41 inserted in the hole 45c so as to project upwardly of the printed board 45. A connector 46 is soldered and an illuminating lamp 47 is mounted onto the upper surface of the printed board 45, while a plurality of sets of fixed points (not shown) form patterns on the lower surface of the printed board in correspondence with the sliding members 43 and 44. The lamp 47 and the fixed point layout patterns are connected to a connector 46, with a connector pin 46a of the connector 46 passing through the small hole and out the cover 34.

Reference numeral 48 denotes drive rods, each of which has an upper small diameter section 48a and a lower large diameter section 48b, with both ends of the small diameter section 48a and those of the large diameter section 48b formed into a spherical shape. The small diameter sections 48a of the drive rods 48 are fitted into three of the through holes 25 so as to be movable in the vertical dimension, with the upper end of each small diameter section 48a contacting the lower face of the operation member 27, and the lower ends of the large diameter sections 48b passing through the cutouts 45a and the holes 45b in the printed board 45 so as to contact the tapered faces 40a of the first sliders 40.

A drive member 49 is disposed between the guide plates 30. A joining section 49a projects out from the upper central portion of the drive member 49, and is joined to a slide knob 50 disposed on the recess 23 by being snapped in the slot 29, whereby moving the slide knob 50 along the slot 29 from above the case 20 in a reciprocative fashion causes the drive member 49 to reciprocate along the guide plate 30 in the same dimension as the reciprocative movement of the slide knob 50. A thick-walled section 49b is formed on each end of the drive member 49, with the thick-walled sections 49b having from therein a first blind hole 54 and a second blind hole 52, respectively, extending from a side thereof. A ball 58 is accommodated in either one of the first blind hole 51 and second blind hole 52 via a spring 57. A pair of retaining walls 49c are formed so as to extend vertically at the lower central surface of the drive member 49, between which the drive projection 41a of the second slider 41 is positioned. As shown in FIG. 6, four cam sections 53, 54, 55, and 56 are formed at four locations at the inner side of the guide plates 30. The ball is such as to be either in engagement of out of engagement with any one of the cam sections 53, 54, 55, and 56, so that the drive member 49 clicks during operation. Four different click operations can be felt by the operator using common component parts as a result of selecting either the first blind hole 51 or the second blind hole 52 as the accommodating member of the spring 57 and the ball 58, and selecting the direction of insertion of the guide member 49 between the guide plates, with the directions of insertion being opposite each other or differing by 180 degrees. The case 20 and the cover 34 are firmly secured to the printed board 45 with a setscrew 59.

A description will now be given of the operation of the switch device with the above-described construction. When the slide knob 50 which projects above the case 20 is at an intermediate position, the motor is not driven, regardless of whether or not the slide knob 31 is pressed for driving a mirror. When the slide knob 50 is moved from its intermediate position along the slot 29, and reciprocates between both guide plates 30, the retaining walls 49c of the drive member 49 move, causing the second slider 41 to reciprocate in the second accommodating section 37, and thus causing the second sliding members 44 held by the second slider 41 to slide on the fixed contact patterns (not shown) on the bottom surface of the printed board 45 so that they are positioned relative to each other. This switches the contact point of the selection circuit, causing either the left or right mirror to be in a driving waiting state. In this case, the ball 58, accommodated in either the blind hole 51 or 52 of the drive member 49, repeatedly engages with and disengages from either one of the first to fourth cam sections 53 to 56 formed in the guide plates 30, while being subjected to resilient force exerted by the spring 57, so that the operator can recognize whether or not the slide knob is at the intermediate position, or the left and right switching state by a predetermined click felt by the operator.

When a certain location of the slide knob 31 is pressed, the drive rod 48 located below the pressed location of the knob 31 moves downward in relation to the respective through hole 25 below. The movement of the drive rod 48 becomes horizontal at the tapered face 40a of the first slider 40 below, which moves in opposition to the spring 42 into the first accommodating section 36. Movement of the first slider 40 causes the first sliding member 43 held by the above slider 40 to slide on the fixed point patterns (not shown) formed on the lower surface of the printed board 45, whereby the switch in correspondence with the pressed location (pressed member) of the operation member 31 is selected from the three slide switches, and turned on. In response to the ON signal, the motor (not shown) rotates in either the forward or reverse direction, producing a driving power which is transmitted through a power transmission system (not shown) to the mirror selected first, as a result of which the mirror is driven. In this case, when the operation member is pressed, the click rubber 33 below the pressed location is deformed, making it possible for the operator to know whether the switch has been turned on based on a predetermined click felt by the operator. When the predetermined location of the operation member 31 is released, the operation member 31 is restored back to its original state by the restoring force of the click rubber 33, while the first slider 40 and the drive rod 48 in contact with the first slider 40 are restored back to their original state by the restoring force of the spring 42, as illustrated in FIG. 4, as a result of which the switch is turned off.

In the switch device having the above-described construction, however, when the operation member 31 or the knob 50 is operated, the first sliding member 43 retained by the first sliders 40 or the second sliding member 44 retained by the second slider 41 slides on the lower surface of the printed board 45, causing the contact point section is to be worn after long use, which may prevent switching operations as a result of contact failure. In addition, the first sliding member 43 is disposed in the recess 40c of the first slider 40, while the second sliding member is disposed in the recess 44b of the second slider 41, thus resulting in a complicated contact section structure, so that experience and time are required for assembling the structure.

SUMMARY OF THE INVENTION

Accordingly, a first object of the present invention is to provide a switch device having a contact section which does not wear after long use, wherein sliding along a contact section is minimized.

A second object of the present invention is to provide a switch device which makes it possible to use a small number of component parts and makes it easier to perform assembly.

A third object of the present invention is to provide a switch device which makes it possible to reduce the number of component parts used for the contact section, and which utilizes the operating power or the applied pressing force in order to perform contact connection.

To achieve the aforementioned first object, according to a form of the present invention, there is provided a switch device comprising a case with an open bottom, a movable contact member with at least one movable contact section, a slide knob for performing switching operations, a drive member, comprising a retaining section, which is joined to the slide knob thorough a slot formed in the case and reciprocates horizontally, whereby the movable contact section is pressed downwards, and a printed board which is inserted in the case and is provided with at least one fixed contact which contacts the movable contact section as a result of vertical movement of the movable contact section, so as to allow electrical conduction.

To achieve the aforementioned second object, according to a second form of the present invention, there is provided a switch device comprising a case with an open bottom, an operation member retained by the case so as to be movable tiltablly, a location of which is pressed in order to selectively switch a plurality of contacts, a printed board disposed at the bottom side of the case and provided with a plurality of fixed contacts, and a movable contact member made of insulating resin and provided with a plurality of integrally formed thin metallic plate-shaped movable contacts disposed in correspondence with the fixed points on the printed board.

To achieve the third object, according to a third form of the present invention, there is provided a switch device comprising a case with an open bottom, an operation member retained by the case so as to be movable vertically, a resilient member provided with a plurality of projecting sections below the operation member, a plurality of movable contact sections disposed below the plurality of projecting sections of the resilient member, and a plurality of fixed contacts disposed below the plurality of movable contact sections. In the switch device, a certain location of the operation member is pressed, causing the projecting sections below to selectively press the plurality of movable contact sections below facing the resilient member.

To achieve the aforementioned third object, according to a fourth form of the present invention following the third form, the resilient member is a rubber sheet member provided with integrally formed projecting sections, and the case has disposed therein a partition wall. The operation member is retained above the partition wall such that it can move tiltablly, and the rubber sheet member is disposed between the partition wall and the operation member. A certain location of the operation member is pressed, causing the projecting sections below to pass through holes formed in the partition member in order to selective press the plurality of movable contact sections below.

To achieve the aforementioned first object, according to a fifth form of the present invention following the first form, the switch device further comprises an operation member which is retained by the case so as to be tiltablly movable, a location of which is pressed in order to selectively switch a plurality of contacts. The printed board is provided with another plurality of fixed contacts for the operation member. An other movable contact member made of insulating resin is secured to the printed board, and is provided with a plurality of thin, metallic plate-shaped movable contacts sections disposed in correspondence with the separate fixed contacts of the printed board.

To achieve the aforementioned first object, according to a sixth form of the present invention following the first form, the switch device further comprises an operation member retained by the case so as to be movable tiltablly, and a resilient member with a plurality of integrally formed projection sections. The printed board is provided with an other plurality of fixed contacts for the operation member. In addition, the switch device further comprises an other movable contact member made of insulating resin and provided with a plurality of integrally-formed thin, metalic, plate-shaped movable contact sections disposed in correspondence with the separate fixed contacts of the printed board. When a certain location of the operation member is pressed, the projecting sections below causes selective connection of the movable contact sections of the other movable contact member to the other fixed contacts on the printed board.

To achieve the aforementioned first and second objects, according to a seventh form of the present invention following the second, fifth, and sixth forms, the other movable contact member is virtually H-shaped, with the movable contact sections of the other movable contact member arranged in one direction.

To achieve the aforementioned second object, according to an eighth form of the present invention following the third form, the resilient member comprises a plurality of contact face sections which contacts the operation member, an integrally formed projecting sections disposed in correspondence with the contact face sections, and resilient skirt sections.

In the aforementioned first form of the present invention, when the slide knob used to perform switching operations is operated, causing the drive member to reciprocate horizontally, the retaining section of the drive member presses the movable contact section of the movable contact member downward, whereby the movable contact section comes into contact with the fixed contact of the printed board, as a result of which electricity is conducted, thus turning on the switch. Accordingly, in the first aspect of the present invention, the ON/OFF operations are controlled by mainly vertical movement of the movable contact section, and not by sliding of the sliding member, as has been the case conventionally, thus eliminating the problem of wearing of the contact section, allowing longer use, and making it easier to perform assembly.

In the second form of the present invention, the contact section is formed by the printed board with a plurality of fixed contacts and an other movable contact member with a plurality of integrally formed movable contact sections disposed in correspondence with the fixed contacts on the printed board, thus simplifying the structure, reducing the number of component parts, and making the assembly easier.

In the third form of the present invention, a certain location of the operation member is pressed, causing the projection sections to be pressed in order to selective switch a plurality of contacts, thus making it unnecessary to use an actuator used conventionally, reducing the number of component parts, and making the assembly easier to perform.

In the fourth form of the present invention following the third form described above, when a certain location of the operation member is pressed, the projection sections passes through the hole formed below in the partition wall in order to selectively switch a plurality of contacts disposed on the cover, making it unnecessary to use a motor required conventionally. In addition, the rubber sheet member retain the partition wall member, thus reducing the number of component parts, and making it easier to perform assembly.

In the seventh form of the present invention, the other movable contact member is substantially H-shaped, with the movable contact sections of the other contact member arranged in one dimension, so that the space factor is improved, and manufacturing can be performed more precisely by press molding.

In the eighth form of the present invention, the resilient member comprises a contact face section contacting the operation member, an integrally formed projecting section disposed so as to oppose the contact face section, and resilient skirt sections.

DESCRIPTION OF THE PREFERRED EMBODIMENT

A description will now be given of a switch device of an embodiment of the present invention utilized as an automobile mirror switch device as in the conventional example, with reference to the drawings.

Figure 1:
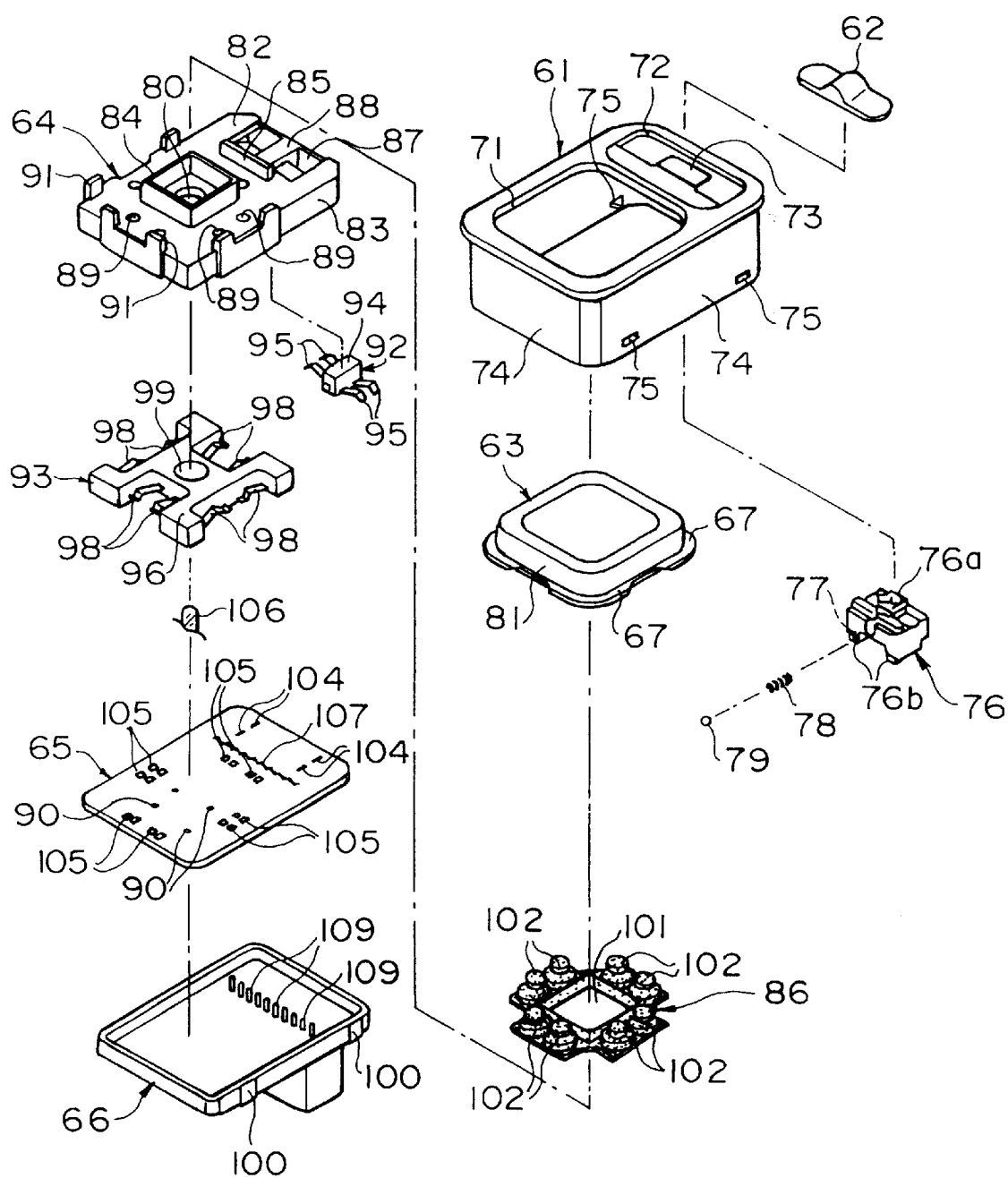
FIG. 1 is an exploded perspective view of an embodiment of a switch device in accordance with the present invention.
Figure 2:
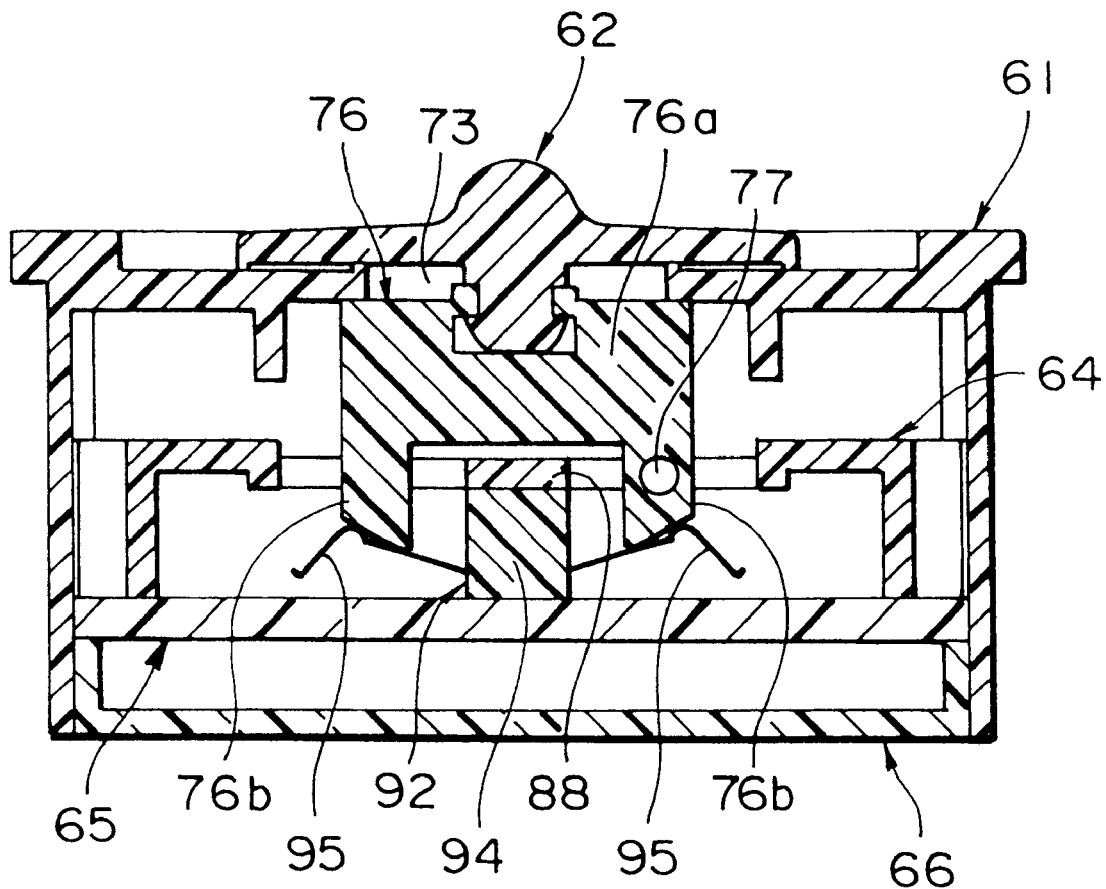
FIG. 2 is a vertical section of the switch section in the embodiment of the switch device of the present invention.
Figure 3:
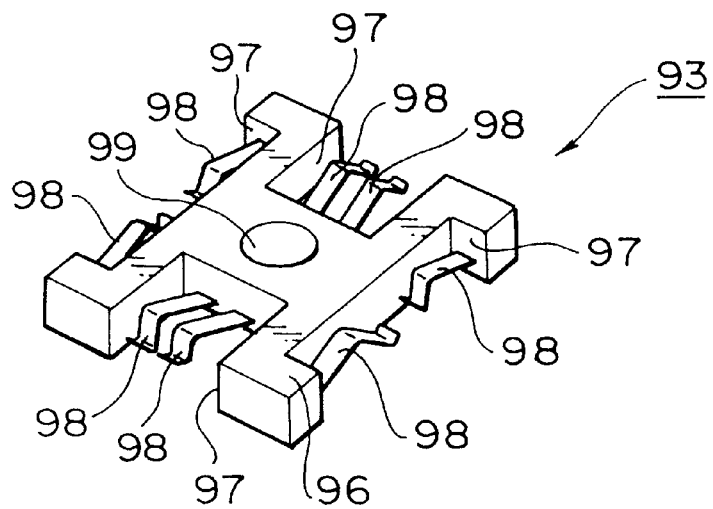
FIG. 3 is a perspective view of only the movable contact in the embodiment of the switch device of the present invention.

FIG. 1 is an exploded perspective view of the embodiment of the switch device of the present invention. FIG. 2 is sectional view of a switch section for selecting a left or a right mirror. FIG. 3 is a vertical section of a portion of the rubber spring thereof.

As shown in FIG. 1, the switch device primarily comprises: (1) a case 61 with an open bottom, (2) a slide knob 62 for controlling the switching operation for selection of a left or a right mirror driving motor (not shown), (3) a knob pad 63, being an operation member, for setting the vertical and horizontal directions of the mirror, (4) a holder 64, being a partition wall, disposed in the case 61 in order to hold the knob pad 63 or the like, (5) a printed board 65 having printed thereon a plurality of fixed contact patterns, and (6) a bottom plate 66, being a cover for fixing the case 61, the holder 64, and the printed board 65.

A substantially square-shaped receiving hole 71 and a shallow recess 72 substantially rectangular in a plane are formed side by side in the upper surface of the case 61. A slot 73 is formed in the recess 72. A pair of retaining holes 75 are formed at a predetermined interval in the lower portion of two side faces 74, facing each other, of the case 61.

As illustrated in FIGS. 1 and 2, the slide knob 62 is fitted into the recess 72 so as to be slidable in the longitudinal dimension. A slider 76, serving as a drive member, is formed below the recess 72 of the case 61. A joining section 76*a* projects out from the upper central face of the slider 76, and is joined to the slide knob 62 by being snapped in the slot 73. The slide knob 62 is disposed in the recess 72 in the case 61. Therefore, when the slide knob 62 is moved reciprocally from above the case 61 along the slot 73, the slider 76 also reciprocates in the same dimension. A thick-walled section 76*b* is formed on each end of the slider 76 so as to project below each end, with a blind hole 77 formed in one of the thick-walled sections 76*b* so as to extend from a side thereof. A ball 79 is accommodated in the blind hole 77 through a spring 78.

The knob pad 63 is shaped like a plate and comprises a projecting section 81 and a flange section 67. The projecting section 81 is substantially square-shaped in a plane and is inserted into a receiving hole 71 such that it can move vertically. The flange section 67 contacts the peripheral sides of the receiving hole 71 in the case 61. The knob pad 63 is fitted into the case 61 as a result of inserting the projecting section 81 into the receiving hole 71 from below the case 61 and bringing the flange section 67 into contact with the lower portions of the peripheral sides of the receiving hole 71 in the case 61.

The holder 64 comprises: (1) an upper face section 82 which is substantially square-shaped in a plane, (2) side face sections 83 which extend vertically downward from the peripheral sides of the upper face section 82, (3) an annular projecting wall 84 which is substantially squared-shaped in a plane and are formed vertically on the upper face section 82, and (4) a tabular guide wall 85 which extends in the reciprocating dimension of the slider 76 and contacts the ball 79. A through hole 80 is formed in the center of the portion surrounded by the projecting walls 84. The projecting section 81 of the knob pad 63 is fitted to the projecting wall 84 via a rubber spring 86. Though not illustrated in detail, the guide wall 85 has a cam section which corresponds to the cam section 53 of the above-described conventional example. When the cam section resiliently engages the ball 79, the operator feels a click during switching operations. A slot 87 is formed at a side facing the projecting wall 84 and the guide wall 84 so as to extend in the dimension the slider 76 reciprocates, with a bridge 88 formed in the center of the slot 87 in the longitudinal dimension so as to retain a portion extending between the thick-walled section 76*b* of the slider 76 from below. The width in the longitudinal dimension of the slot 87 across which the bridge is formed is smaller than the length of the thick-walled section 76*b* of the slider 76, so as to allow the slider 76 to reciprocate. Two small holes 89 are formed adjacent to each of the four sides of the projecting wall 84, and at an equal interval so as to surround the projecting wall 84. Retaining pawls 91 are formed at three of the four sides of the holder, excluding the side having formed therein the slot 87.

A first movable contact member 92 and a second movable contact member 93 are disposed below the holder 64. The first movable contact member 92 comprises a prismatic body section 94 which has about the same width as the bridge 88, and two pairs of movable contact sections 95, one end of being fixed to a facing side of the body section 94. The one face of the body section 94 which does not have fixed thereto any movable contact section 95 is fixed to the lower face of the bridge 88. Therefore, the movable contact sections 95 are located below the slot 85. As illustrated in detail in FIG. 3, the second movable contact member 93 comprises a body section 96 made of insulating resin and being substantially H-shaped, and movable contact sections 98 which are thin metallic plates, a pair of which is formed in each of the four recesses 97 in the body section such than an end of each movable section 98 projects out. A through hole 99 is formed at about the center of the body section 96. When the movable contact sections 98 are disposed at the lower surface of the holder 64, they are disposed in correspondence with the small holes 89. When the through hole 99 is disposed at the lower surface of the holder 64, it communicates with the through hole 80.

A description will now be given of a method of producing the above-described second movable contact member 93. Elongated metallic thin plates are prepared, and are continuously pressed to form the plates roughly into the shape of the movable contact sections 98. Here, the individual movable contact sections are joined. The joined movable contact sections are placed into a molding machine in order to form the body section 96, made of insulating resin, around the movable contact sections. Thereafter, the joined portions of the movable contact sections are cut so as to separate them into individual contact sections.

Figure 4:
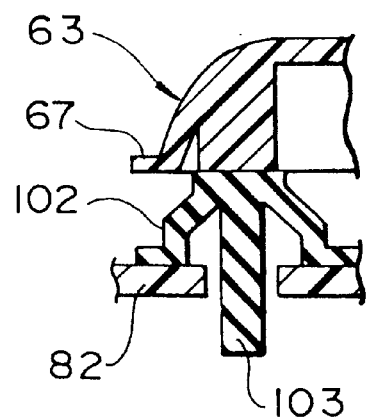
FIG. 4 is a vertical section of only one portion of the rubber spring of the embodiment of the switch device of the present invention.
Figure 5:
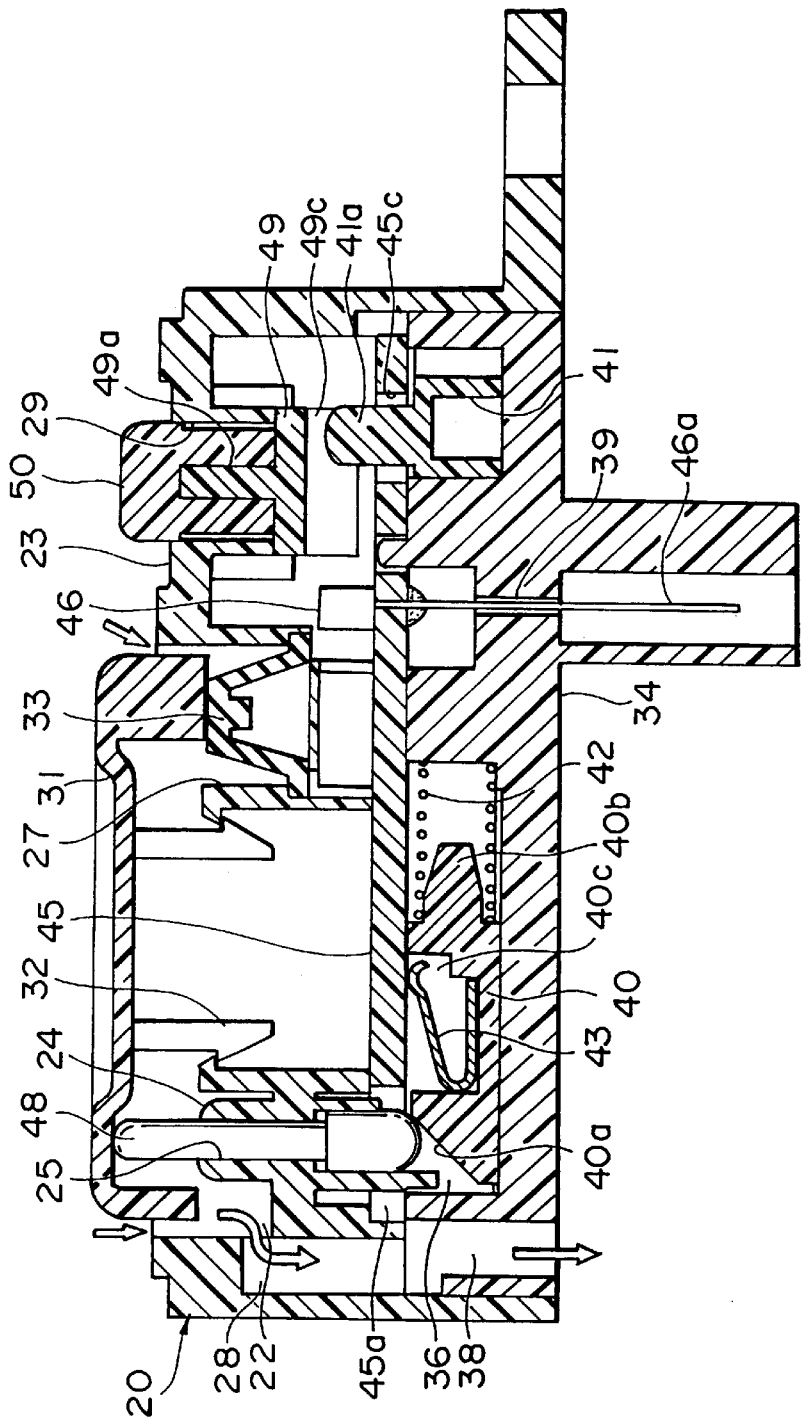
FIG. 5 is a vertical section of a conventional switch device.
Figure 6:
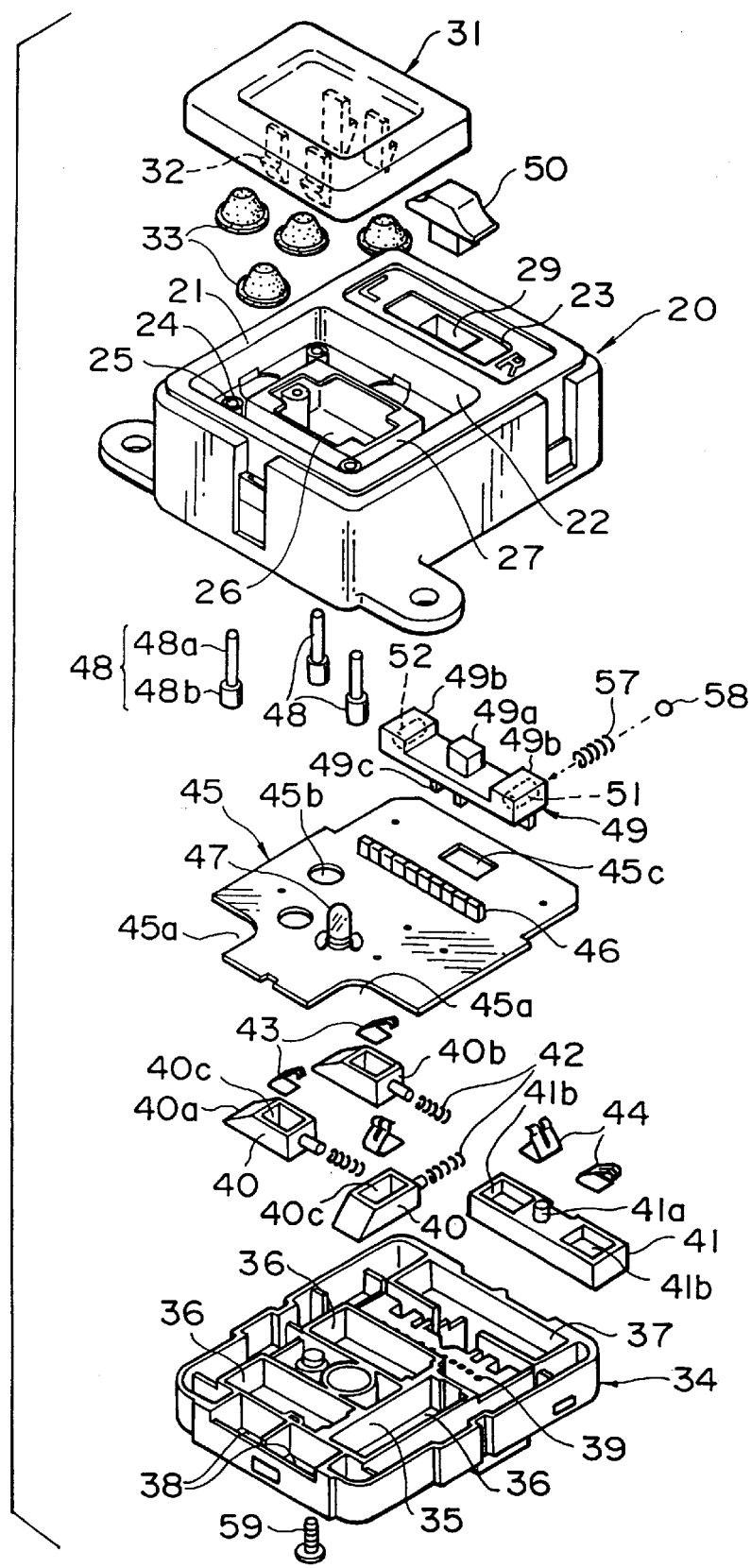
FIG. 6 is an exploded perspective view of the conventional switch device.
Figure 7:
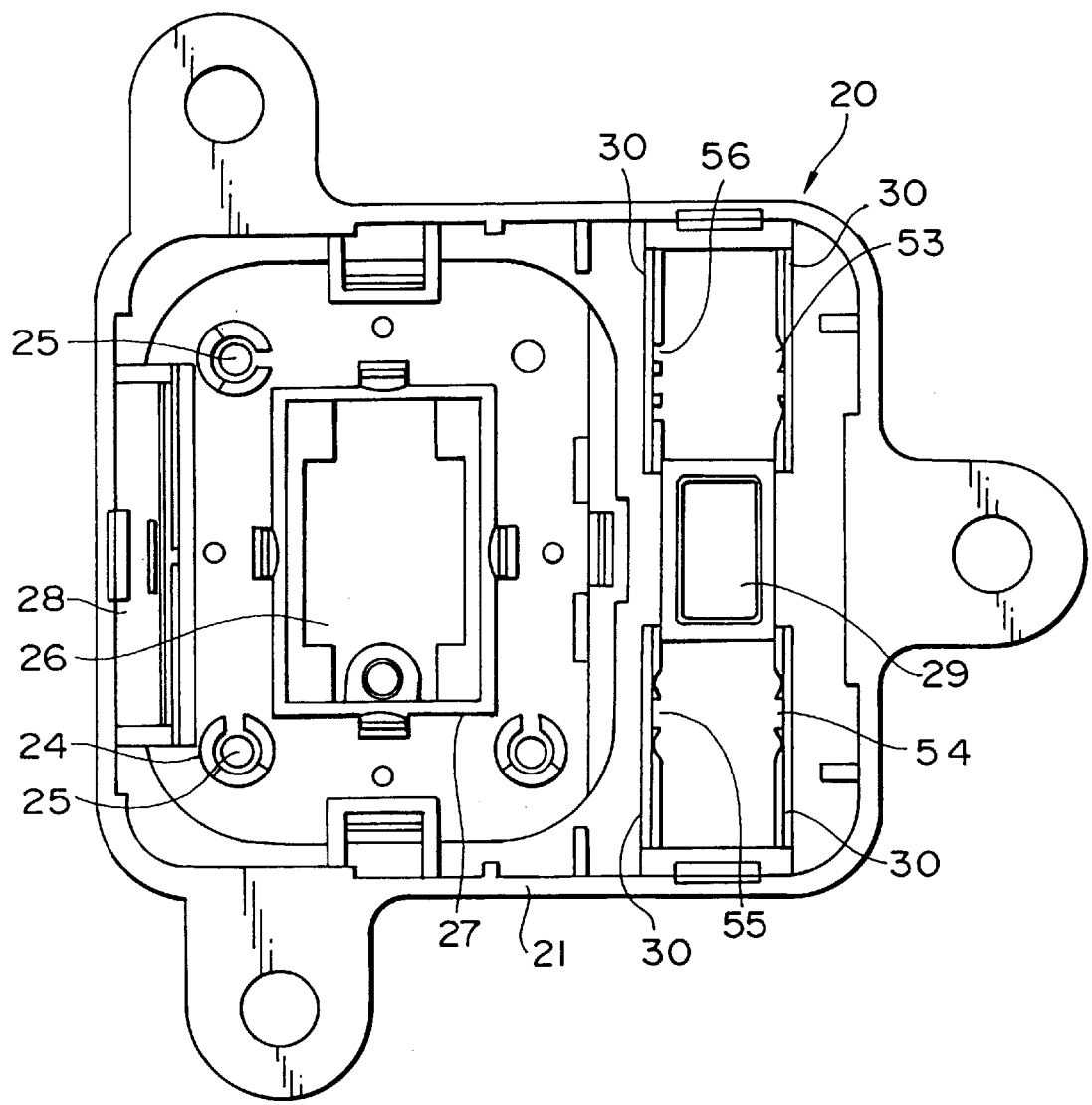
FIG. 7 is a bottom view illustrating only the case of the conventional device.

The rubber spring 86 comprises an opening 101 and eight rubber springs 102. The opening 101 is square-shaped in a plane and is formed in the center of the spring 86 so as to receive the projecting wall 84. The rubber springs 102 form skirt sections and surround the opening 101, with two springs 102 provided on each side so as to extend upwardly therefrom. As shown in FIG. 4, each rubber spring 102 is in contact with the periphery of the knob pad 63, that is the lower surface near the flanges 67. Actuators 103, being rod-shaped projections which extend downward, are integrally provided in the rubber springs 102 of the rubber spring 86. When the projecting wall 84 of the holder is fitted into the opening 101 in the rubber spring, the actuators 102 are inserted into the small holes 89, such that the lower ends of the actuators 102 are positioned at the upper surface of their respective movable contact sections 98 of the second movable contact member 93.

In the above-described rubber spring 86, the rubber springs 102 and the actuators 103 are integrally formed. It is of primary importance to select the material used for the rubber spring 86 such that the rubber springs 102 are excessively resilient. Therefore, the actuators 103 must also be resilient. Since the actuators 103 function to press the movable contact sections 98, it is important to minimize deformation, such as bending, of the actuators 103 due to their resiliency. Thus, the actuators 103 are formed into the shape of rods with a diameter allowing the actuators 103 to press the movable contact sections 98 in opposition to the resilient forces of the movable contact sections 98, so as not to bend the actuators 103. Even if the diameters of the actuators 103 are a little smaller than the required diameter, the small holes 89 in the holder 64 receive and support the actuators 103, thereby assisting the actuators 103 when they function.

The printed board 65 has formed thereon four sets of first fixed contacts 104 facing the movable contact sections 95 of the first movable contact member 92, and a total of eight sets of second fixed contacts 105 facing the movable contact sections 98 of the second movable contact member 93, two sets of which are formed on a side. An illuminating lamp 106 is disposed at about the center of the portion surrounded by the second fixed contacts 105. The lamp 106 projects into the through hole 99 in the body section 96 in order to illuminate the upper face of the knob pad 63 from the back side. The layout patterns of the fixed points 104 and 105 and the lamp 106 are connected to a connector (not shown). Reference numeral 90 denotes threaded holes used for fixing the second movable contact member 93, and reference numeral 107 denotes small holes used for a connector thereof.

The bottom plate 66 is fitted to the open end of the case 61, thus forming the outer shell of the switch device. Connector pins 109 are formed vertically at the bottom face 108 carrying the printed board 65. Retaining pawls 100 are formed on the periphery of the bottom plate 66 in order to retain the retaining holes 75 of the case 61.

A description will now be given of the operation of the switch device with the above-described construction.

As illustrated in FIG. 2, when the slide knob 62, projecting above the case 61, is at an intermediate location, the motor is not driven, regardless of whether the mirror driving knob pad 63 is pressed, as in the conventional example. When the slide knob 62 moves along the slot 73 from the intermediate position, causing the slider 76 to reciprocate along the recess 72, the thick-walled sections 76b of the slider 76 engages a set of the movable contact sections 95 of the first movable contact member 92, so that one of the movable contact sections 95 contact the fixed contacts 104 located below. This causes the contact of a selection circuit to be switched, causing either one of the left or right mirrors to be in a driving waiting state in accordance with the direction of movement of the slide knob 62. In this case, the ball 79 accommodated in the blind hole 77 in the slider 76 repeatedly engages and disengages the cam section of the guide wall 85, while being subjected to the resilient force of the spring 78, thus making it possible for the operator to feel a predetermined click, indicating whether or not the slide knob is at the intermediate position and the left and right switching state.

On the other hand, when a certain location of the knob pad 63 is pressed, the rubber spring section 102 below of the rubber spring 86 disposed below the pressed location is deformed, causing the actuator section 103 thereof to move downward, so that the lower end thereof presses the movable contact section 98 of the second movable contact member 93, so as to engage the fixed contact 105 below. This causes the contact section in correspondence with the pressed location of the knob pad 63 to be selectively in an ON state. In response to the ON signal, the motor (not shown) rotates in either the forward or reverse direction. The driving power of the motor is transmitted to the selected mirror through a driving power transmission system (not shown), whereby the mirror is driven. When the knob pad 63 is pressed, the rubber spring 102 of the rubber spring 86 located below the pressed location deforms, so as to indicate to the operator that the switch is turned on when he feels a predetermined click. When the knob pad 63 is released, the knob pad 63 returns to its original shape, as shown in FIG. 4, as a result of the restoring force of the rubber spring section 102 below of the rubber spring 86, whereby the switch is turned off.

A description will now be given of how to assemble the switch device having the above-described construction.

The knob pad 63 is inserted into the open end of the case 61 such that the projecting section 81 of the knob pad 63 projects out from the receiving hole 71 in the case 61. The slide knob 62, on the other hand, is fitted within the recess 72, and the slider 76 is placed from below the case 61 in order to snap the joining section 76a in the slot 73 so as to join the joining section 76a to the slide knob 62. Then, the rubber spring 86 is placed on the holder 64. The opening 101 of the rubber spring 86 is fitted along the projecting wall 84 of the holder 64, and the actuators 103 are inserted into the small holes 89 in the holder 64. The body section 94 of the first movable contact member 92 is fixed to the back face of the bridge 88 of the holder 64. Accordingly, the holder 64 having fitted thereto the rubber spring 86 and the first movable contact member 92 is inserted in the case 61, such that the rubber spring sections 102 of the rubber spring 86 are positioned within the projecting section 81 of the knob pad 63, and such that the bridge 88 is located between thick-walled sections 76b of the slider 76. The second movable contact member 93 is fixed to the surface of the printed board 65 such that the movable contact sections 98 face the fixed contacts 105 on the printed board 65. The printed board 65 is mounted to the lower face of the holder 64 having mounted thereto the rubber spring 86, such that the fixed contacts 104 thereof are disposed at a predetermined interval from the movable contact sections 95 of the first movable contact member 92. Lastly, the bottom plate 66 is fitted into the open end of the case 61 by retaining the retaining pawls 100 thereof in the retaining holes 75 in the case 61. In this way, the component parts are inserted into the case from one direction, whereby the switch device is assembled much more easily.

In the foregoing description, the switch device comprises: (1) a case 61 with an open bottom end, (2) a movable contacting member 92 having vertical movable contact sections 95, 95, (3) a slide knob 62 for performing switching operations, (4) a drive member 76, comprising a retaining section, which is joined to the slide knob 62 via the slot 73 in the case 61 so as to reciprocate horizontally, whereby the movable contact sections 95, 95 are pressed downward, and (5) a printed board 65 which is inserted in the case 61 and is provided with the fixed contacts 104 which allow conduction of electricity when press-contacted by the movable contact sections 95. Therefore, the ON/OFF operations are controlled by the vertical movement of the movable contact sections 95, and not by sliding the sliding member as has been conventionally the case, thus eliminating the problem of wearing of the contact section, allowing longer use and easier assembly.

In the foregoing description, the switch device comprises a case 61 with an open bottom end, and an operation member 63 retained by the case such that it can move vertically, a certain location of which is pressed in order to selectively switch a plurality of contacts below. In the switch device, a printed board 65 having formed thereon a plurality of fixed contacts 104 and 105 is placed at the lower side of the case 6, and has mounted thereto a separate movable contact member 93 made of insulating resin and provided with a plurality of integrally-formed thin plate-shaped metallic movable contact sections 98 disposed in correspondence with the fixed contacts 105, thus resulting in a simpler construction, reducing the number of component parts, and making the assembly simpler to perform.

In addition, in the foregoing description, the switch device comprises a case 61 with an open bottom, an operation member 63 retained by the case such that it can move vertically, and a resilient member 86 located below the operation member 63 and integrally provided with a plurality of projecting sections. In the switch device, when a certain location of the operation member 63 is pressed, the projecting section 103 selectively presses and switches the plurality of contacts 98 disposed facing the resilient members 86, thus making it unnecessary to use an actuator required conventionally, reducing the number of component parts, and making the assembly easier to perform.

Further, in the foregoing description, the switch device comprises a case 61 with an open bottom and having a partition wall member 64 disposed therein, a cover 66 for covering the bottom open end of the case 61, an operation member 63 retained upwardly of the partition wall 64 such that it can move vertically, and a rubber sheet member 86 disposed between the partition wall member 64 and the operation member 63, and having a plurality of integrally formed projecting sections 103. In the switch device, when a certain location of the operation member 63 is pressed, the projecting section 103 below passes through the hole 89, whereby a plurality of contacts 98 disposed above the cover 66 are selectively switched, thus making it unnecessary to use an actuator required conventionally. In addition, the rubber sheet member is retained by the partition wall member 64, thus reducing the number of component parts, and making the assembly easier to perform.

Further, in the foregoing description, the switch device comprises: (1) a case 61 with an open bottom, (2) a movable contact member 92 provided with movable contact sections 95 which can move vertically, (3) a slide knob for performing switching operations, 4) a drive member 76, comprising a retaining section, which is joined to the slide knob 62 via the slot 73 in the case 61 so as to reciprocate horizontally, whereby the movable contact sections 95, 95 are pressed downward, and (5) a printed board 65 which is inserted in the case 61 and is provided with fixed contacts 104 which allow conduction of electricity when press-contacted by the movable contact sections 95. In addition, there are separately provided fixed contacts 105 provided for the opertion member, disposed on the printed board 65. A movable contact member 93, provided with integrally formed plurality of movable contact sections 98 in correspondence with the fixed contacts 105, is affixed to the printed board. Therefore, ON/OFF operations are controlled by the vertical movement of the contact sections 98, and not by the sliding of the sliding member required conventionally, thereby eliminating the problem of wearing of the contact section, allow longer use, making the assembly easier to perform, making the construction simpler, and reducing the number of component parts.

In the foregoing description, the switch device comprises: (1) a case 61 with an open bottom end, (2) a movable contacting member 92 having vertically movable contact sections 95, 95, (3) a slide knob 62 for performing switching operations, (4) a drive member 76, comprising a retaining section, which is joined to the slide knob 62 via the slot 73 in the case 61 so as to reciprocate horizontally, whereby the movable contact sections 95, 95 are pressed downward, and (5) a printed board 65 which is inserted in the case 61 and is provided with fixed contacts 104 which allow conduction of electricity when press-contacted by the movable contact sections 95. In addition, the switch device comprises an operation member 63 retained by the case 61 so as to be movable vertically, a rubber sheet member disposed below the operation member 63 and provided with a plurality of integrally formed projecting sections. Separately formed fixed contacts 105 are provided on the printed board 65 for the operation member 63. A separate movable contact member 93 is provided, which has a plurality of integrally formed movable contact sections 98 in correspondence with the fixed contacts 105. In the switch device, when a certain location of the operation member 63 is pressed, the movable contact section, located below, of the movable contact member 93 is selectively connected with the fixed contact 105 located below on the printed board 65, thus controlling the ON/OFF operation by the vertical movement of the movable contact section 98, without the use of a sliding member required conventionally, thus eliminating the problem of wearing of the contact section, allowing longer use, making the assembly easier to perform, making the construction simpler, and reducing the number of component parts.

Further, according to the present embodiment, the movable contact member 93 is substantially H-shaped, and the movable contact sections 98, mounted to the body section of the movable contact member 93, are arranged along one dimension, thereby improving the space factor, and allowing manufacturing to be performed more precisely, using mold pressing.

Further, according to the present embodiment, the resilient member 86 comprises a contact face which contacts the operation member 63, and projecting sections 103 integrally formed at a location facing the contact face, and resilient skirts 102, so that fewer component parts need to be used.

In the first form of the present invention, the ON/OFF operations are controlled by the vertical movement of the movable contact section, without the use of sliding member required conventionally, thereby eliminating the problem of wearing of the contact section, allowing longer use, and making it easier to perform assembly.

In the second form of the present invention, the contact section is formed by the printed board with a plurality of fixed contacts and a separate movable contact member with a plurality of integrally formed movable contact sections disposed in correspondence with the fixed points on the printed board, thus simplifying the structure, reducing the number of component parts, and making the assembly easier.

In the third form of the present invention, when a certain location of the operation member is pressed, the projecting section below passes through the hole formed in the partition wall, causing the plurality of contacts disposed below and on the face opposing the resilient member to be selectively switched, thus making it unnecessary to use an actuator conventionally required, and reducing the number of component parts. In addition, the resilient member can retain the partition wall, thereby making it easier to perform assembly.

In the fourth form of the present invention, when a certain location of the operation member is pressed, the projection section below passes through the hole below formed in the partition wall, causing the plurality of contacts below on the cover to be selectively switched, thus making it unnecessary to use an actuator required conventionally. In addition, the rubber sheet member can hold the partition wall, thus reducing the number of component parts, and making it easier to perform assembly.

In the fifth form of the present invention, the operational effects produced in the first and second forms of the invention can be obtained at the same time.

In the sixth form of the present invention, the operational effects produced by the first, second, and fourth forms of the present invention can be obtained at the same time.

In the seventh form of the present invention, the separately formed movable contact member is substantially H-shaped, with the movable contact section of the separate movable contact members arranged in one dimension, thus improving the space factor, and allowing manufacturing to be performed more precisely by press molding.

In the eighth form of the present invention, the resilient member comprises a contact face section which contacts the opertion member, an integrally formed projecting section disposed so as to oppose the contact face section, and resilient skirt sections, thus making it possible to reduce the number of component parts.

What is claimed is:

1. A switch device, comprising:
   a case with an open bottom;
   a first movable contact member housed within said case and having a first plurality of movable contact sections;
   a slide knob for selectively producing vertical movement of said first movable contact sections;
   a printed circuit board disposed in said case and provided with a plurality of fixed contacts;
   whereby vertical movement of said first movable contact sections produces contact of selected ones of said first plurality of contact sections with selected ones of said plurality of fixed contacts;
   a second movable contact member housed within said case;
   said second movable contact member being of a generally H-shape having a portion extending laterally from each of the four corners of said H-shape;
   a second plurality of movable contact sections extending from said lateral portions of said second contact member in a direction toward each other; and
   a third plurality of movable contact sections connected to the center of said H-shape of said second contact member and extending longitudinally therefrom;
   at least one of said second or third plurality of movable contact sections being movable to engage at least one of said plurality of fixed contacts, to close said switch device.

2. A switch device in accordance with claim 1 including,
   an operation member retained by said case as to be movable vertically; and
   a resilient member disposed below said operation member and provided with a plurality of projecting sections facing said second and said third plurality of movable contact sections,
   wherein when any location of said operation member is pressed, it causes at least one of said projecting sections to press into at least one of said second and said third plurality of movable contact sections to engage at least one of said plurality of fixed contacts to close said switch device.

3. A switch device according to claim 2 wherein said second movable contact member is substantially H-shaped, said second and said third movable contact sections thereof being arranged in one dimension.

4. A switch device in accordance with claim 2 wherein said resilient member comprises a plurality of face sections which contact said operation member, a plurality of projecting sections integrally formed therein so as to face the corresponding movable contact sections, and a plurality of resilient skirt sections on said resilient member.

5. A switch device according to claim 2, wherein said resilient member is a rubber sheet member provided with a plurality of integrally formed projecting sections, and wherein said case has provided therein a partition wall with a hole above which said operation member is retained so as to be tiltably movable, said rubber sheet member being disposed between said partition wall and said operation member so that when said operation member is pressed, at least one of said projecting sections passes through said hole in the partition wall, whereby at least one of said second or said third plurality of movable contact sections in said second movable contact member engages at least one of said plurality of fixed contacts of said printed circuit board.

6. A switch device according to claim 1, further comprising:
   an operation member in said case which is tiltably movable to selectively press at least one of said plurality of contact sections in said second movable contact member into contact with at least one of said plurality of fixed contacts on said printed circuit board, said second movable contact member being made of insulating resin provided with a plurality of integrally-formed thin, metallic movable contact sections.

7. The switch device according to claim 6, wherein said second movable contact member is substantially H-shaped, said second and said third movable contact sections thereof being arranged in one dimension.

8. A switch device according to claim 1, further comprising:
   an operation member in said case and tiltably movable therein; and
   a resilient member disposed below said operation member and provided with a plurality of integrally-formed projecting sections,
   said second contact member being made of insulating resin and provided with a plurality of integrally-formed thin metallic movable contact sections disposed in correspondence with said fixed contacts, wherein when said operation member is tilted, said projecting section disposed below causes at least one of said second and said third movable contact sections to be connected to at least one of said fixed contacts on said printed circuit board.

9. A switch device according to claim 8, wherein said second movable contact member is substantially H-shaped, said second and said third movable contact sections thereof being arranged in one dimension.

10. A switch device, comprising:
    a case with an open bottom;
    an operation member retained by said case so as to be movable tiltably, a location of which is pressed in order to selectively switch a plurality of contact;
    a printed circuit board disposed at the bottom face of said case and provided with a plurality of fixed contacts; and
    a movable contact member made of insulating resin and provided with a plurality of integrally-formed thin metallic movable contact sections disposed in correspondence with the plurality of fixed contacts on said printed circuit board;
    wherein said movable contact member is of a generally H-shape having a portion extending laterally from each of the four corners of said H-shape;
    said plurality of movable contact sections including a first plurality of movable contact sections and a second plurality of movable contact sections,
    said first plurality of movable contact sections extending from said lateral portions of said movable contact member in a direction toward each other; and
    said second plurality of movable contact sections connected to the center of said H-shape of said movable contact member and extending longitudinally therefrom.

11. A switch device according to claim 10 wherein said first and second plurality of movable contact sections are arranged in one dimension.

12. A switch device in accordance with claim 10, further including:
- a resilient member disposed below said operation member and provided with a plurality of projecting sections facing said first and said second plurality of movable contact sections,
- wherein when any location of said operation member is pressed, it causes at least one of said first and said second plurality of movable contact sections to engage at least one of said plurality of fixed contacts to close said switch device.

13. A switch device according to claim 12, wherein said resilient member is a rubber sheet member provided with a plurality of integrally formed projecting sections, and wherein said case has provided therein a partition wall with at least one hole above which said operation member is retained so as to be tiltably movable, said rubber sheet member being disposed between said partition wall and said operation member so that when said operation member is pressed, at least one of said projecting sections passes through at least one of said holes in the partition wall, whereby at least one of said first or said second plurality of movable contact sections in said movable contact member engages at least one of said plurality of fixed contacts of said printed circuit board.

14. A switch device in accordance with claim 12 wherein said resilient member comprises a plurality of face sections which contact said operation member, a plurality of projecting sections integrally formed therein so as to face the corresponding contact sections, and a plurality of resilient skirt sections on said resilient member.

* * * * *